United States Patent Office
2,892,700
Patented June 30, 1959

2,892,700

METHOD FOR SEPARATING AND PURIFYING GERMANIUM FROM SUBSTANCES CONTAINING METALLIC GERMANIUM

Oskar Rösner, Goslar, Germany

No Drawing. Application February 16, 1955
Serial No. 488,709

Claims priority, application Germany February 16, 1954

3 Claims. (Cl. 75—84)

This invention relates to methods of separating and purifying germanium.

It is known to separate and purify germanium by a chlorination process. In this method however a significant part of the germanium is lost and difficulties occur, which are usual in chlorination.

According to this invention, germanium is separated from substances containing germanium in metallic form and is purified in the following simple way:

The initial substances are heated in a stream of carbon dioxide to high temperatures—preferably more than 800° C.—whereby volatile germanium monoxide is formed according to the reaction $Ge + CO_2 = GeO + CO$.

The germanium monoxide evaporates and condenses at the cooler parts of the container in form of a brownish coating. Further preparation, involving recovering elemental germanium from the germanium monoxide, is done in the usual way as, for example, in accordance with the process described in U.S. Letters Patent 2,576,267.

What is claimed is:

1. In a method of recovering germanium from a substance containing metallic germanium, the improvement which comprises exposing said substance to an atmosphere consisting essentially of carbon dioxide gas at an elevated temperature to convert the metallic germanium to germanium monoxide.

2. In a method of recovering germanium from a substance containing metallic germanium, the improvement which comprises heating said substance to a temperature in excess of 800° C. in a stream of carbon dioxide gas to convert the germanium to germanium monoxide vapor.

3. In a method according to claim 2, the further step of condensing said germanium monoxide vapor.

References Cited in the file of this patent

UNITED STATES PATENTS 2,757,068    Inuzuka et al. _____ July 31, 1956

FOREIGN PATENTS 378,017    Great Britain _____ July 22, 1931

OTHER REFERENCES

Powell et al.: "The Extraction . . . of Germanium and Gallium," Journal of Applied Chemistry, vol. 1, December 1951, pp. 541–551.